United States Patent
Aesch, Jr.

(10) Patent No.: US 6,708,444 B2
(45) Date of Patent: Mar. 23, 2004

(54) PESTICIDE APPLICATION SYSTEM

(76) Inventor: Harold W. Aesch, Jr., 915 E. Fork Dr., Phoenix, AZ (US) 85048

( * ) Notice: Subject to any disclaimer, the term of this patent is extended or adjusted under 35 U.S.C. 154(b) by 0 days.

(21) Appl. No.: 10/186,515

(22) Filed: Jul. 1, 2002

(65) Prior Publication Data

US 2003/0196370 A1 Oct. 23, 2003

Related U.S. Application Data

(63) Continuation-in-part of application No. 10/127,116, filed on Apr. 22, 2002, now abandoned.

(51) Int. Cl.[7] ............................................... A01M 1/20
(52) U.S. Cl. ........................... 43/124; 43/131; 43/132.1
(58) Field of Search ..................... 43/124, 131, 132.1, 43/900; 52/101; 239/73, 271, 272, 327; 174/66, 67

(56) References Cited

U.S. PATENT DOCUMENTS

| | | | | |
|---|---|---|---|---|
| 2,755,968 A | * | 7/1956 | Fiant ....................... 141/311 R |
| 2,981,025 A | * | 4/1961 | Woodson ..................... 43/124 |
| 3,973,732 A | * | 8/1976 | Diggs ........................ 239/271 |
| 4,132,364 A | * | 1/1979 | Harmony ..................... 239/542 |
| 4,190,206 A | * | 2/1980 | Atkinson et al. ........... 239/271 |
| 4,413,756 A | * | 11/1983 | Kirley ................... 202/402.11 |
| 4,625,474 A | * | 12/1986 | Peacock et al. ............... 52/101 |
| 4,648,202 A | * | 3/1987 | Renth ....................... 43/132.1 |
| 4,823,505 A | * | 4/1989 | Jackson ....................... 43/124 |
| 4,833,277 A | * | 5/1989 | Jacoby, Jr. et al. ........... 174/66 |
| 4,893,434 A | * | 1/1990 | Knipp et al. .................. 43/124 |
| 4,945,673 A | * | 8/1990 | Lavelle ....................... 43/124 |
| 5,058,312 A | * | 10/1991 | Jackson ....................... 43/124 |
| 5,231,796 A | * | 8/1993 | Sims .......................... 43/124 |
| 5,309,669 A | * | 5/1994 | Jackson ....................... 43/124 |
| 5,347,749 A | * | 9/1994 | Chitwood et al. ............. 43/124 |
| 5,361,533 A | * | 11/1994 | Pepper ........................ 43/124 |
| 5,937,572 A | * | 8/1999 | Neumann .................... 43/132.1 |
| 6,053,373 A | | 4/2000 | Sutton et al. |
| 6,297,450 B1 | * | 10/2001 | Yu ............................. 174/66 |
| 6,493,987 B1 | * | 12/2002 | Aesch, Jr. et al. ............. 43/124 |

OTHER PUBLICATIONS

The Insider Brochure Date: Oct. 23, 1998 Company PARA-GON United States.

New System VII Borchure Date Sep. 1999 Whitmire Micro-Gen, Research Laboratories, Inc. St. Louis, Mo. United States.

* cited by examiner

*Primary Examiner*—Robert P. Swiatek
*Assistant Examiner*—David Parsley
(74) *Attorney, Agent, or Firm*—John D. Lister

(57) ABSTRACT

A pesticide application system includes an anchor conduit and a dispensing tube for dispensing a pressurized fluid pesticide into an interior cavity of a hollow wall. The anchor conduit functions to convey a pressurized fluid pesticide from an outside surface of the hollow wall into the interior cavity of the hollow wall and anchors the pressurized fluid pesticide dispensing tube to the hollow wall. The anchor conduit has an opening at an outer end for connecting the system to a pressurized fluid pesticide dispenser. The dispensing tube is mounted on an inner end of the anchor conduit to dispense pressurized fluid pesticide into the wall cavity. The anchor conduit of the system may be placed directly in the wall, in a cover plate on the wall or in a utility cover plate on the wall or the anchor conduit may be an integral part of a cover plate on the wall.

26 Claims, 4 Drawing Sheets

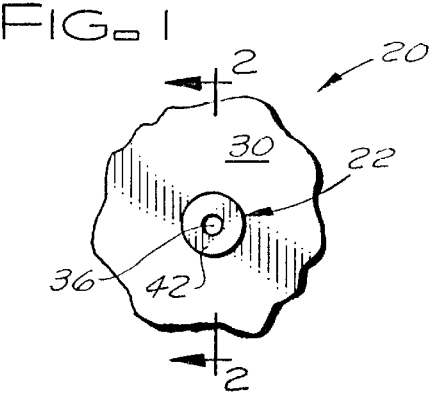
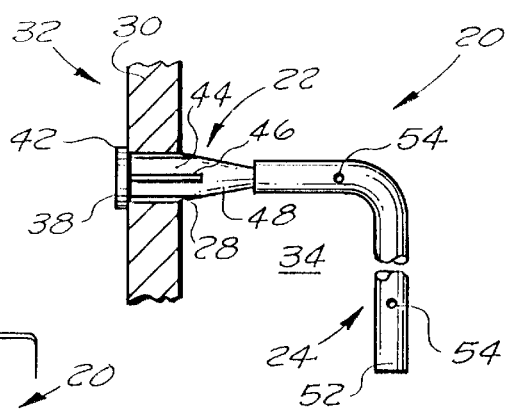
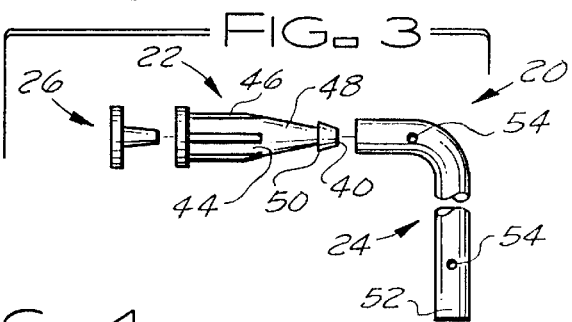
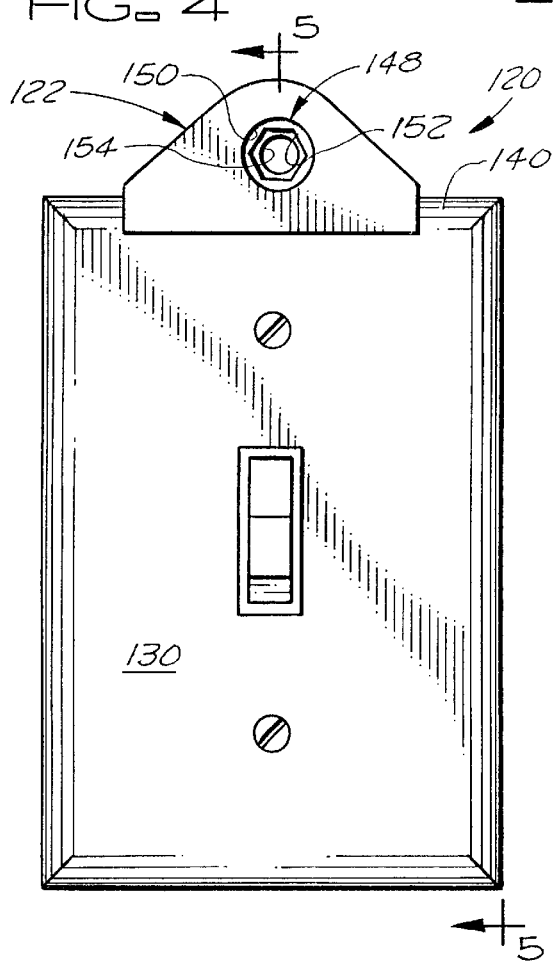
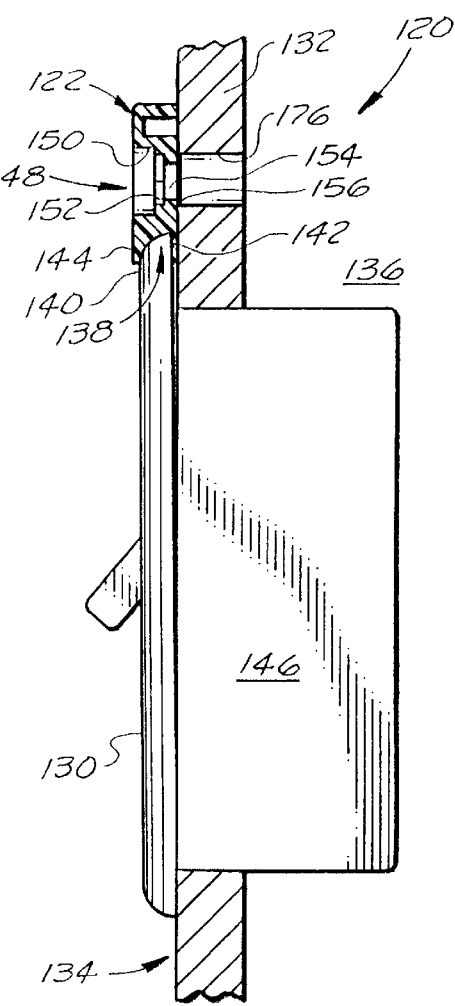

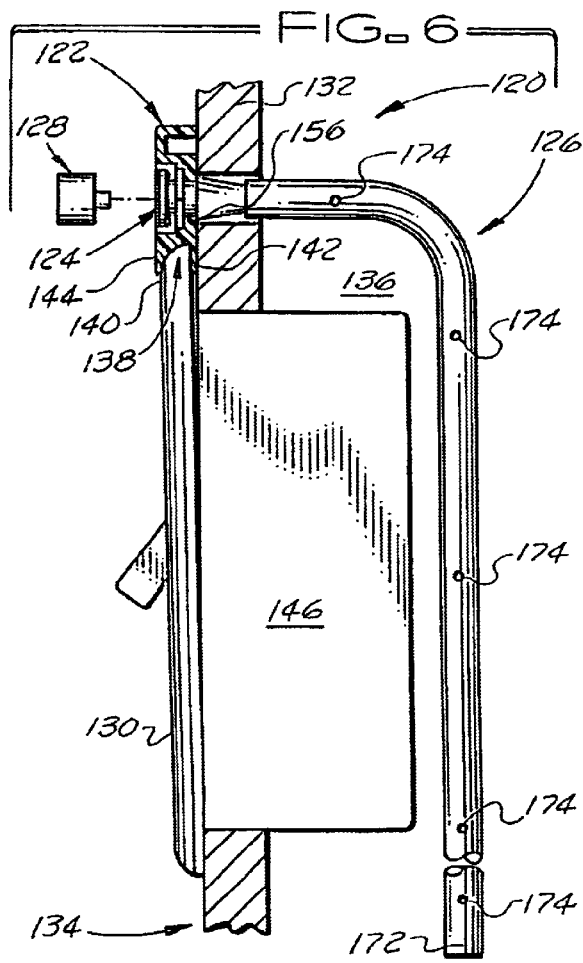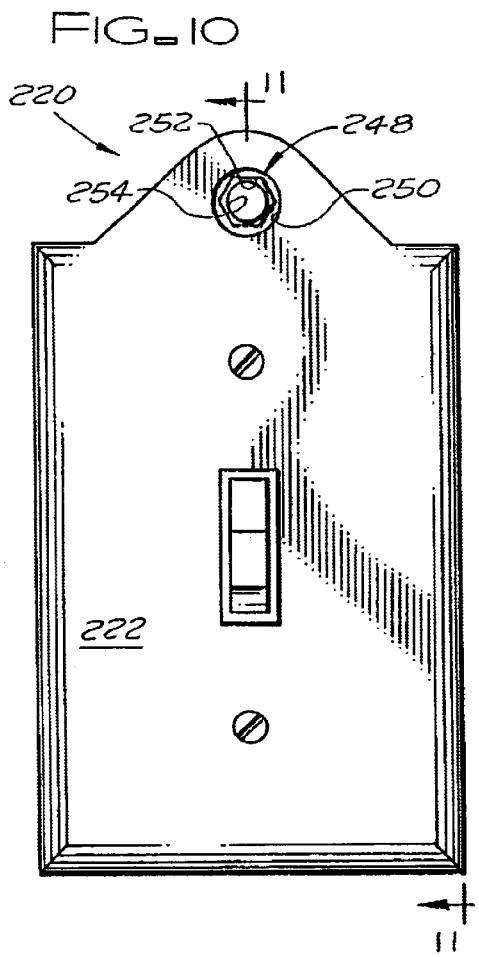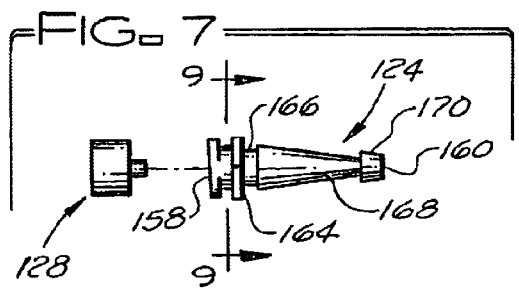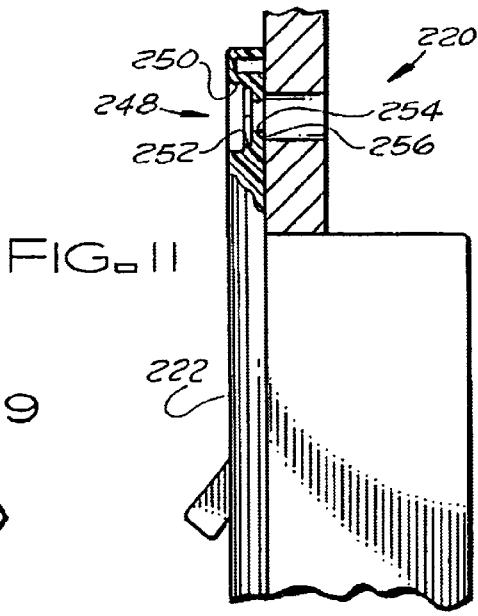

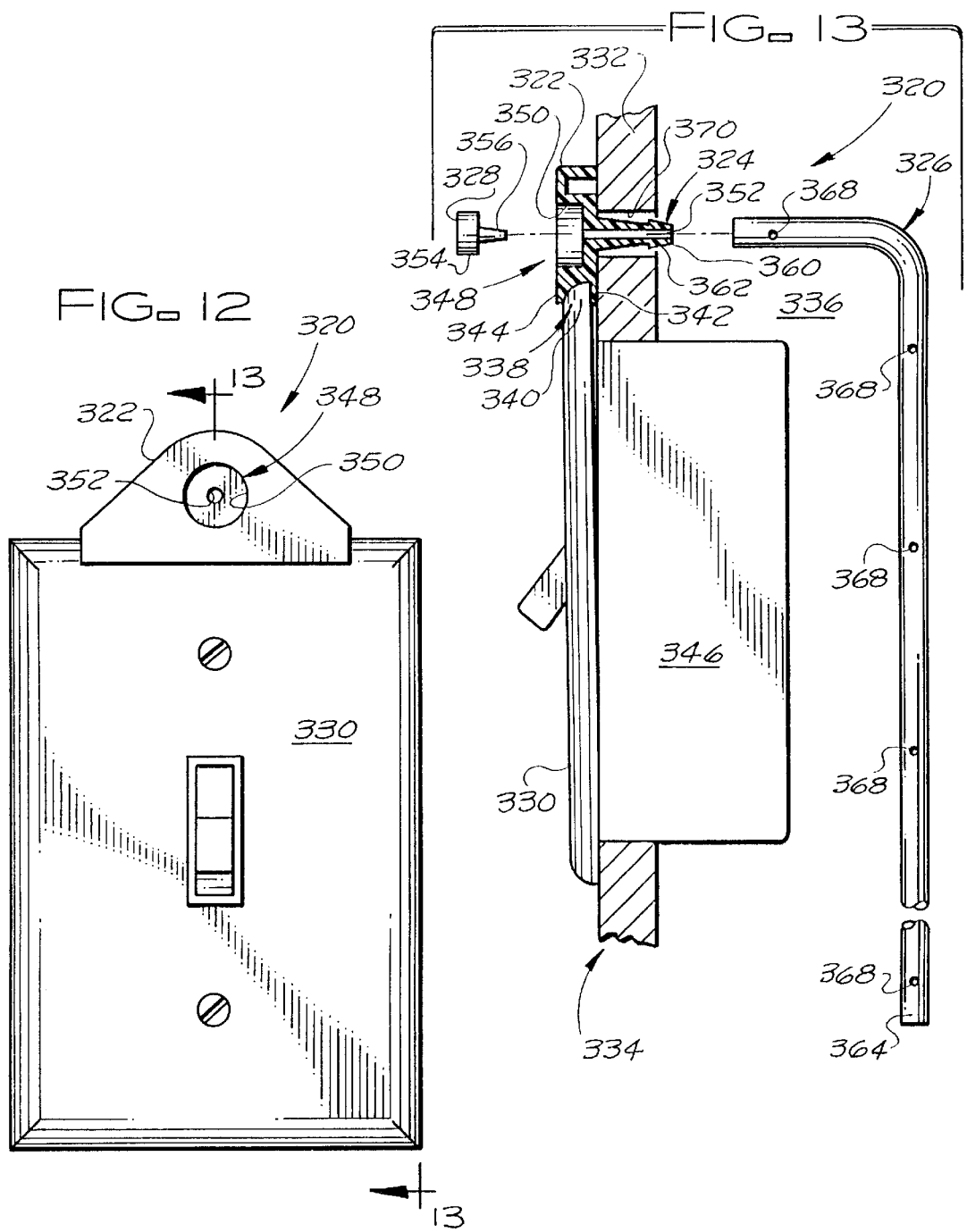

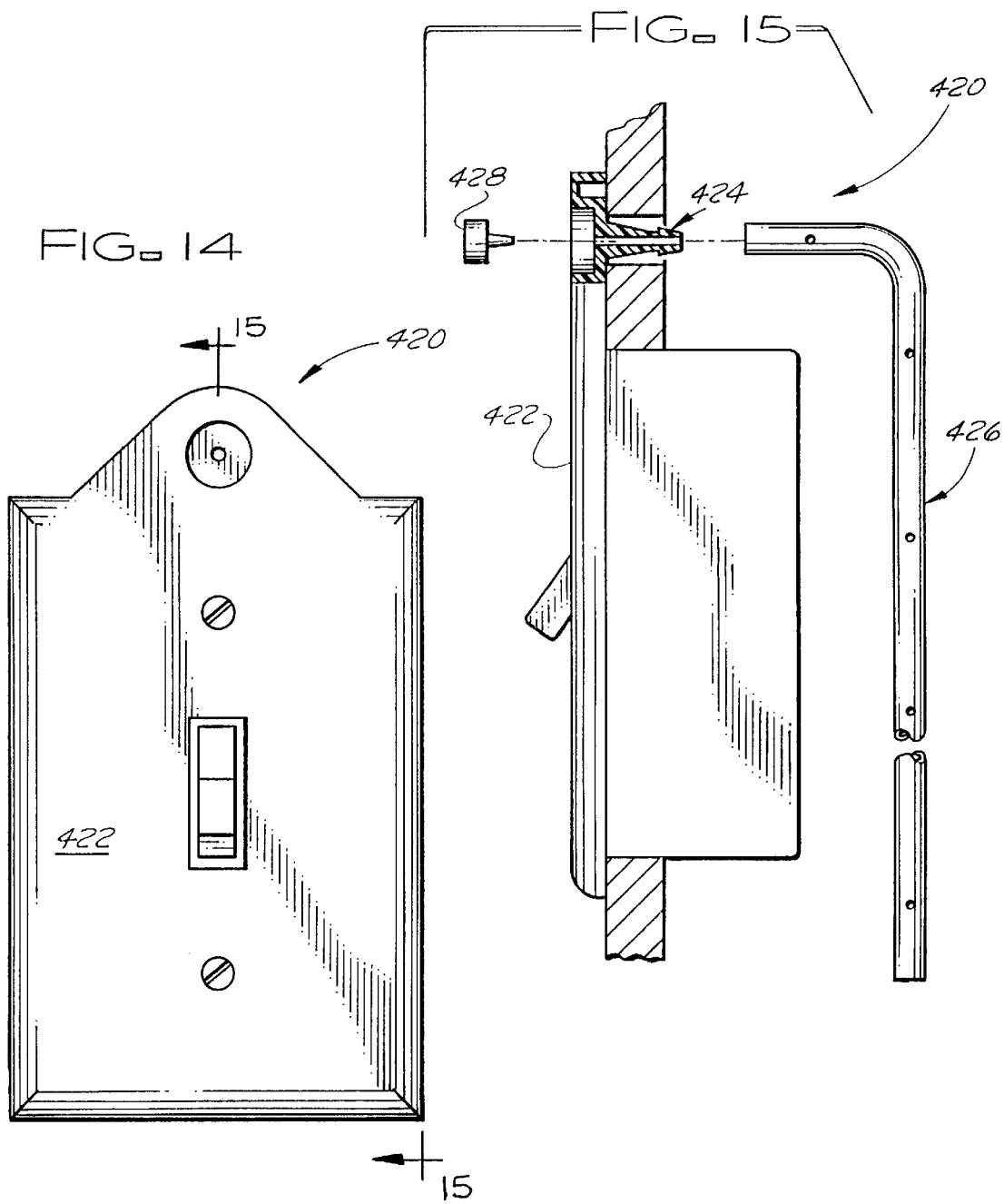

PESTICIDE APPLICATION SYSTEM

This patent application is a continuation in part of patent application Ser. No. 10/127,116, filed on Apr. 22, 2002, now abandoned, entitled "PESTICIDE APPLICATION SYSTEM", inventor Harold W. Aesch, Jr.

BACKGROUND OF THE INVENTION

The subject invention relates to a pesticide application system for applying pesticides within the cavities of hollow wall structures; and in particular, to a permanent, easily serviced, unobtrusive pesticide application system for applying pressurized fluid pesticides within hollow wall structures that can be initially installed in a wall or retrofitted in a wall while maintaining the aesthetically pleasing appearance of the wall.

The treatment of cavities in the hollow walls of and behind and under the cabinets of homes, offices, apartments, restaurants, and other residential and commercial buildings with pesticides for pest control presents numerous problems, especially, when the buildings are occupied. For many applications, the occupants desire to maintain the aesthetic appearance of the outside surface of the wallboard or paneling forming the hollow wall. Thus, visible holes in the wallboard or paneling of a hollow wall through which pesticides can be sprayed into the cavity of a hollow wall should be kept to a minimum or eliminated. In addition, these cavities may need repeated pesticide treatments over a period of months or years and to save both time and expense it would be desirable to perform such repeated treatments through a minimum number of treatment stations that are permanent and provide ready access to such cavities to dispense pesticides throughout the cavities without unduly damaging or marring the outside surface of the wallboard or paneling forming the hollow wall.

One method currently used by the pest control industry to dispense fluid pesticides within hollow wall cavities utilizes tubular plugs that are inserted in holes made in the wallboard or paneling of a hollow wall. The fluid pesticides can be sprayed through the tubular plugs into the hollow wall cavities. However, the dispensing of fluid pesticides in hollow wall cavities through these tubular plugs presents several problems. First, the outer ends of the plugs are visible on the outside surface of the wallboard or paneling forming the hollow wall. Secondly, the area of pesticide coverage within the hollow wall cavity of the pesticide sprayed through each tubular plug is limited, especially, when the wall contains insulation, wiring, plumbing and other obstructions. Thus, in order to obtain full pesticide coverage within hollow wall cavities when utilizing these tubular plugs, numerous tubular plugs must be placed in the wall. The need for numerous tubular plugs detracts further from the appearance of the outside surface of the wall and the need to service numerous treatment stations to assure complete pesticide coverage within the hollow wall cavities increases the time required and possibly the amount of pesticide applied to complete a treatment. Thus, there has remained a need for a permanent, easily and quickly serviced, unobtrusive system for effectively dispensing pressurized fluid pesticides throughout the cavities of hollow walls in such buildings.

SUMMARY OF THE INVENTION

The pesticide application system of the subject invention provides a solution to the problems currently encountered in dispensing pressurized fluid pesticides within the hollow walls of homes, offices, apartments and other residential and commercial buildings by providing a permanent, easily and quickly serviced, unobtrusive system for effectively dispensing pressurized fluid pesticides throughout the cavities of hollow walls in such buildings. The pesticide application system of the subject invention can be installed in hollow walls when a building is being constructed or may be retrofitted into hollow walls of existing buildings, even when the wall cavities contain insulation, e.g. blowing wool insulation, electrical wiring, plumbing, and other obstructions.

The pesticide application system of the subject invention includes an anchor conduit for anchoring the system to a hollow wall and a dispensing tube for dispensing a pressurized fluid pesticide from the system into an interior cavity of a hollow wall. The anchor conduit functions to convey a pressurized fluid pesticide from an outside surface of a hollow wall into an interior cavity of the hollow wall and to anchor the dispensing tube within the interior cavity of the hollow wall. The anchor conduit has an opening at an outer end for connecting the system to a pressurized fluid pesticide dispenser. The dispensing tube is mounted on an inner end of the anchor conduit to dispense pressurized fluid pesticide into a wall cavity. The anchor conduit of the system may be placed directly in the wallboard of a hollow wall, in a cover plate mounted on a hollow wall, or in a utility cover plate mounted on a hollow wall. The anchor conduit may also be an integral part of a cover plate or utility cover plate.

As used herein, the term "utility cover plate" includes wall mounted cover plates for equipment used in connection with the provision of services such as electrical power, lighting, telephone communications, and television and internet cable services, such as but not limited to the cover plates for light switches, electrical receptacles (outlets), phone jacks, television jacks, cable connections, etc.

As used herein, the term "pesticides" includes insecticides, termiticides and other such toxic substances used to control or exterminate cockroaches, ants such as but not limited to carpenter ants, termites, and other such pests.

The term "fluid" is used herein in its broadest sense, including, without limitation, liquids, gels, foams, and gases that can be flowably dispensed under pressure from a pressurized aerosol can or other pressurized source. However, the pesticide application system of the subject invention is especially well suited for dispensing fluid pesticides as a spray such as but not limited to typical pesticide sprays dispensed from aerosol cans. For example, the pesticide application system of the subject invention can be used to dispense an aerosol pesticide spray marketed by Waterbury Companies, Inc. of Waterbury, Conn., under the trade designation CB-40 EXTRA.

BRIEF DESCRIPTION OF THE DRAWINGS

FIG. 1 is a front-end view of the anchor conduit of a first embodiment of the pesticide application system of the subject invention installed in a wall.

FIG. 2 is a cross section through the wall of FIG. 1, taken substantially along lines 2—2 of FIG. 1, to show the pesticide application system of FIG. 1 installed in the wall.

FIG. 3 is an exploded view of the pesticide application system of FIG. 1 including a closure fitting not shown in FIGS. 1 and 2.

FIG. 4 is front view of an auxiliary cover plate of a second embodiment of the subject invention mounted on a utility cover plate.

FIG. 5 is a side view of FIG. 4, partially in section and substantially along lines 5—5 of FIG. 4, to show the cross section of the auxiliary cover plate of the second embodiment of the subject invention.

FIG. 6 is a side view similar to FIG. 4, with the anchor conduit and dispensing tube of the system mounted within the auxiliary cover plate of the second embodiment of the subject invention.

FIG. 7 is an exploded side view of the anchor conduit and a closure fitting of the second embodiment of the subject invention FIG. 8 is a front-end view of the anchor conduit of FIG. 7.

FIG. 9 is a transverse cross section through the anchor conduit of FIG. 7 taken substantially along lines 9—9 of FIG. 7.

FIG. 10 is front view of a utility cover plate of a third embodiment of the subject invention.

FIG. 11 is a partial side view of FIG. 10, partially in section and substantially along lines 11—11 of FIG. 10, to show the cross section of the upper portion of utility cover plate of the second embodiment of the subject invention.

FIG. 12 is a front view of an auxiliary cover plate of a fourth embodiment of the subject invention mounted on a utility cover plate wherein the anchor conduit is an integral part of the auxiliary cover plate.

FIG. 13 is a side view of FIG. 12, partially in section and substantially along lines 13—13 of FIG. 12, to show the cross section of the auxiliary cover plate of the fourth embodiment of the subject invention. The view is an exploded side view that also includes the dispensing tube and closure fitting of the fourth embodiment that are not illustrated in FIG. 12.

FIG. 14 is a front view of a utility cover plate of a fifth embodiment of the subject invention wherein the anchor conduit is an integral part of the utility cover plate.

FIG. 15 is a side view of FIG. 14, partially in section and substantially along lines 15—15 of FIG. 14, to show the cross section of the upper portion of utility cover plate of the fifth embodiment of the subject invention. The view is an exploded side view that also includes the dispensing tube and closure fitting of the fifth embodiment that are not illustrated in FIG. 14.

DESCRIPTION OF THE PREFERRED EMBODIMENTS

FIGS. 1 to 3 illustrate a first embodiment 20 of the pesticide application system of the subject invention. The pesticide application system 20 includes an anchor conduit 22, a dispensing tube 24, and preferably, a closure fitting 26 for sealing the pesticide application system when the pesticide application system is not in use. As shown in FIGS. 1 and 2, the anchor conduit 22 is anchored within a hole 28 in the covering layer 30 forming one side of a hollow wall 32 (the covering layer forming the other side of the hollow wall is not shown) and the dispensing tube 24 is housed within a cavity 34 of the hollow wall between the two covering layers the covering layers 30 may be made from various construction materials that overlay the framework of a building to form a wall, such as but not limited to, various types of wallboard, plywood, solid wood boards, paneling, insulating boards, sheathing, and masonry walls. The hollow wall 32 may be an exterior wall or an interior wall of a building. Where the hollow wall 32 is an exterior wall, the anchor conduit 22 may be anchored within a hole in the covering layer on the interior or exterior side of the wall.

The anchor conduit 22 is greater in length than the thickness of the wallboard 30 and has a cylindrical hole 36 that extends from an outer end 38 of the anchor conduit 22 to an inner end 40 of the anchor conduit. The cylindrical hole 36 is used to convey a pressurized fluid pesticide from an outer surface of the hollow wall 32 into the internal cavity 34 of the hollow wall. The outer end 38 of the anchor conduit 22 has an annular flange 42 that is substantially flush with the outer surface of the hollow wall 32 when the anchor conduit is installed within the hole 28 of the hollow wall. A midportion 44 of the anchor conduit 22 has a generally cylindrical outer surface with longitudinally extending ribs 46 projecting outward from the cylindrical surface that are embedded in the wallboard surrounding the hole 28 to anchor the anchor conduit to the wallboard 30. An inner end portion 48 of the anchor conduit 22 is tapered from the midportion 44 to the inner end 40 of the anchor conduit and has a generally conical outer surface with an annular flange 50, preferably a frustoconical shaped annular flange, for anchoring the dispensing tube 24 to the anchor conduit 22 and by means of the anchor conduit to the wallboard 30 of the hollow wall 32. Preferably, the anchor conduit 22 is made of a polymeric material such as but not limited to a polyvinyl chloride polymer. A typical anchor conduit 22 is about 1 to about 1½ inches in length and has a cylindrical hole 36 about ⅛ of an inch in diameter.

As shown in FIG. 3, the pesticide application system 20 may include a closure fitting 26 to seal the outer end of the cylindrical hole 36 in the anchor conduit 22. While the closure fitting 26 shown in FIG. 3 is a simple plug that is pushed or inserted into the hole 36, other removable closure fittings may be used to seal the outer end of the anchor conduit hole 36 when the pesticide application system is not in use.

Although the dispensing tube 24 may be longer, the dispensing tube 24 is typically from about 1 to about 10 feet long and preferably from about 3 to about 10 feet long. Although, a fitting such as a plug may be used to close the far end of the dispensing tube 24, typically, the tubular sidewall of the dispensing tube 24 is heat sealed together at the far end 52 of the dispensing tube to close the far end of the dispensing tube. The tubular sidewall of the dispensing tube 24 is provided with longitudinally spaced apart openings 54 along the length of the dispensing tube through which a pressurized fluid pesticide is sprayed or otherwise dispensed from the tube into the wall cavity 34. The spacing and size of the openings 54 may vary depending on the type of fluid pesticide being dispensed and the pesticide coverage desired. However, spacings of about 4 to about 6 inches are typical. In addition to being spaced apart along the length of the dispensing tube 24, the openings 54 may also be located at different locations around the circumference of the dispensing tube 24, e.g. locations spaced apart 180°, 90°, or 60°, to dispense the pressurized fluid pesticide into the cavity 34 through or substantially through a dispensing pattern of up to 360° relative to the longitudinal centerline of the dispensing tube.

The dispensing tube 24 is typically made of an inexpensive polymeric material such as but not limited to a polyvinyl chloride polymer. The dispensing tube 24 has an external diameter about equal to or less than the diameter of the hole 28 in the wallboard 30 so that the dispensing tube can be easily fed into the cavity 34 through the hole 28. If the dispensing tube 24 is compressible, the external diameter of the dispensing tube may be slightly greater than the diameter of the hole 28. However, for ease of installation, the external diameter of the dispensing tube 24 is less than the internal diameter of the hole 28, e.g. a diameter of about ¼ of an inch or less for a hole ⁵⁄₁₆ of an inch or greater in diameter. The dispensing tube 24 is elastic and the internal diameter of the dispensing tube 24 in an unexpanded state is less than the diameter of the annular flange 50 on the inner end portion of the anchor conduit 22 so that after the end of the dispensing tube is forced over the annular flange 50, the dispensing tube 24 is firmly secured to the anchor conduit 22. The dispensing tube 24 is flexible so that the dispensing tube can be passed through the hole 28 in the wallboard 30 and through the wall cavity 34. The flexibility of the dispensing tube 24 not only enables the dispensing tube to bend up, down and/or sideways once the dispensing tube has passed through the hole 28 into the cavity 34, but also enables the dispensing tube to pass around electrical wiring, plumbing, and other utilities or obstructions within the cavity 34. In addition, to being flexible, preferably, the dispensing tube 24 is sufficiently stiff to pass through loose fill insulation within the cavity, such as but not limited to glass fiber blowing wool.

While the anchor conduit 22 is unobtrusive, the anchor conduit 22 with its closure fitting 26 is still visible on the outer surface of a wall. However, the dispensing tube 24 enables the anchor conduit 22 to be located in an inconspicuous location, such as but not limited to, adjacent a baseboard of a wall, adjacent a juncture of a wall with a ceiling, adjacent a utility cover plate on a wall, or in other inconspicuous locations. With the anchor conduit 22 in any of these locations a dispensing tube 24 of a selected length to provide the pesticide coverage desired, e.g. 8 to 10 feet long for installations adjacent the baseboard or ceiling, can be passed up or down through the wall cavity and around obstructions in the wall cavity to dispense pesticide throughout the entire cavity 34 or selected portions of the cavity.

FIGS. 4 to 9 illustrate a second embodiment 120 of the pesticide application system of the subject invention. The pesticide application system 120 includes a wall mounted cover plate 122, an anchor conduit 124, a dispensing tube 126, and preferably, a closure fitting 128 for sealing the pesticide application system when the pesticide application system is not in use.

The wall mounted cover plate 122 is an auxiliary cover plate that is mounted on a conventional utility cover plate 130 such as but not limited to the light switch cover plate of FIGS. 4 to 6. As shown in FIGS. 4 to 6, the utility cover plate 130 is mounted on the outside surface of a covering layer 132 forming one side of a hollow wall 134 (the covering layer forming the other side of the hollow wall is not shown) and the dispensing tube 126 is housed within a cavity 136 of the hollow wall 134 between the two covering layers. The covering layers 132 may be made from various construction materials that overlay the framework of a building to form a wall, such as but not limited to, various types of wallboard, plywood, solid wood boards, paneling, insulating boards, sheathing, and masonry walls. The hollow wall 134 may be an exterior wall or an interior wall of a building. Where the hollow wall 134 is an exterior wall, the auxilary cover plate 122 may be mounted on the interior or exterior side of the wall.

The auxiliary cover plate 122 has a channel 138 extending along the bottom of the auxiliary cover plate for mounting the auxiliary cover plate on an edge portion 140 of the utility cover plate 130. The channel 138 includes a rear flange 142 and a front flange 144. When the auxiliary cover plate 122 is mounted on an edge portion of the utility cover plate 130, the rear flange 142 extends between the utility cover plate 130 and the wallboard 132 of the hollow wall 134. When the auxiliary cover plate is mounted on the utility cover plate 130, the front flange 144 fits over the front of the edge portion of the utility cover plate and, preferably, has an internal contour corresponding to the external contour of the edge portion of the utility cover plate. Preferably, the channel 138 fits tightly over the edge portion of the utility cover plate 130 to hold the auxiliary cover plate in place and may be resilient to better grip the edge portion of the utility cover plate. In addition, the rear flange 142 becomes clamped between the edge portion of the utility cover plate 130 and the wallboard 132 when the utility cover plate is secured to the wall e.g. by being fastened to electrical box 146.

The auxiliary cover plate 122 also includes a hole 148 passing from the front to the back of the auxiliary cover plate. In a preferred embodiment, the hole 148 has three axially aligned portions. An outer portion 150 of the hole is cylindrical and forms a recess in the front of the auxiliary cover plate. An intermediate portion 152 of the hole is hexagonal in cross section and forms a recess for receiving a similarly shaped portion of the anchor conduit 124. An inner portion 154 of the hole is cylindrical and forms the inner surface of a collar 156 that anchors the anchor conduit 124 to the auxiliary cover plate 120.

The anchor conduit 124 has a cylindrical hole 157 that extends from the outer end 158 of the anchor conduit to the inner end 160 of the anchor conduit. The cylindrical hole 157 is used to convey a pressurized fluid pesticide from the outer surface of the hollow wall 134 into the internal cavity 136 of the hollow wall. Preferably, the outer end 158 of the anchor conduit 124 has a pair of generally opposed and axially offset flanges 162 that function as threads. The closure fitting 128 is internally threaded and can be threaded onto the offset flanges 162 to seal the pesticide application system when the pesticide application system is not in use and unthreaded from the offset flanges 162 to expose the hole 157 for applying a pressurized fluid pesticide through the system. A flange 164 with a hexagonal peripheral edge is spaced inwardly from the offset flanges 162. When the anchor conduit is mounted in the auxiliary cover plate 122, the hexagonal flange 164 is received within and forms a tight fit with the hexagonal shaped intermediate portion 152 of the hole 148 in the auxiliary cover plate 122. The anchor conduit 124 has an annular groove 166 intermediate the hexagonal flange 164 and an inner end portion 168 of the anchor conduit. When the anchor conduit 124 is fully inserted into the hole 148 in the auxiliary cover plate, at the same time the hexagonal flange 164 is received within the hexagonal portion 152 of the hole 148, the collar 156 of the auxiliary cover plate 122 snaps into position and fits tightly in the annular groove 166 of the anchor conduit to secure the anchor conduit to the auxiliary cover plate. The inner end portion 168 of the anchor conduit 124 is tapered from the annular groove 166 to the inner end 160 of the anchor conduit and has a generally conical outer surface with an annular flange 170, preferably a frustoconical shaped annular flange, for anchoring the dispensing tube 126 to the anchor conduit 124 and to the hollow wall 134 by means of the anchor conduit 124, the auxiliary cover plate 122, and the utility cover plate 130. As shown in FIG. 6, with the auxiliary cover plate 122 mounted on an outer peripheral edge portion of the utility cover plate 130, the anchor conduit 124 anchored within the hole 148 of the auxiliary cover plate 130, and the dispensing tube 126 mounted on the anchor conduit, neither the anchor conduit 124 nor the dispensing tube 126 extend into or through the electrical box 146 to which the utility cover plate 130 is secured. Instead, the anchor conduit 124 and dispensing tube 126 bypass the electrical box 146 to which the utility cover elate 130 is secured.

Although the dispensing tube 126 may be longer, the dispensing tube 126 is typically from about 1 to about 10 feet long and preferably from about 3 to about 10 feet long. Although, a fitting such as a plug may be used to close the far end of the dispensing tube 126, typically, the tubular sidewall of the dispensing tube 126 is heat sealed together at the far end 172 of the dispensing tube to close the far end of the dispensing tube. The tubular sidewall of the dispensing tube 126 is provided with longitudinally spaced apart openings 174 along the length of the dispensing tube through which a pressurized fluid pesticide is sprayed or dispensed from the tube into the wall cavity 136. The spacing and size of the openings 174 may vary depending on the type of fluid pesticide being dispensed and the pesticide coverage desired. However, spacings of about 4 to about 6 inches are typical. In addition to being spaced apart along the length of the dispensing tube 126, the openings 174 may also be located at different locations around the circumference of the dispensing tube 126, e.g. locations spaced apart 180°, 90°, or 60°, to dispense the pressurized fluid pesticide into the cavity 136 through or substantially through a dispensing pattern of up to 360° relative to the longitudinal centerline of the dispensing tube.

The dispensing tube 126 is typically made of an inexpensive polymeric material such as but not limited to a polyvinyl chloride polymer. The dispensing tube 126 has an external diameter less than the diameter of the hole 176 in the wallboard 132 so that the dispensing tube can be easily fed into the cavity 136 through the hole 176. If the dispensing tube 126 is compressible, the external diameter of the dispensing tube may be slightly greater than the diameter of the hole 176. However, with the auxiliary cover plate 122 covering the hole 176, the hole can be relatively large and there should be no need to squeeze the dispensing tube 126 through the hole 176 and thereby make the installation difficult. The dispensing tube 126 is elastic and the internal diameter of the dispensing tube 126 in an unexpanded state is less than the diameter of the annular flange 170 on the inner end portion of the anchor conduit 124 so that after the end of the dispensing tube is forced over the annular flange 170, the dispensing tube 126 is firmly secured to the anchor conduit 124. The dispensing tube 126 is flexible so that the dispensing tube can be passed through the hole 176 in the wallboard 132 and through the wall cavity 136. The flexibility of the dispensing tube 126 not only enables the dispensing tube to bend up, down and/or sideways once the dispensing tube has passed through the hole 176 into the cavity 136, but also enables the dispensing tube to pass around electrical wiring, plumbing, and other utilities of obstructions within the cavity 136. In addition, to being flexible, preferably, the dispensing tube 126 is sufficiently stiff to pass through loose fill insulation within the cavity, such as but not limited to glass fiber blowing wool. Since the dispensing tube 126 of the pesticide application system can pass around electrical wiring, plumbing, and other utilities or obstructions within the cavity 136; can be any selected length to accomplish the task; and can be passed from the location of the utility plate cover 130 up and/or down through the wall cavity, the system 120 is not limited to dispensing pesticide only in the vicinity of the utility cover plate, but can be used to dispense pesticide throughout the entire cavity 136 or through selected portions of the cavity.

FIGS. 10 and 11 illustrate a utility cover plate of a third embodiment 220 of the pesticide application system of the subject invention. In this embodiment of the subject invention, a utility cover plate 222 includes a hole 248, for mounting the anchor conduit 124, that corresponds to the hole 148 in the auxiliary cover plate 122 of the second embodiment of the invention thereby eliminating the need for an auxiliary cover plate to secure the anchor conduit 124 to the wall and cover the hole in the wall through which the dispensing tube 126 passes. In a preferred embodiment, the hole 248 has three axially aligned portions. An outer portion 250 of the hole is cylindrical and forms a recess in the front of the auxiliary cover plate. An intermediate portion 252 of the hole is hexagonal in cross section and forms a recess for receiving a similarly shaped portion of the anchor conduit 124. An inner portion 254 the hole is cylindrical and forms the inner surface of a collar 256 that anchors the anchor conduit 124 to the utility cover plate 222. Other than eliminating the need for the auxiliary cover plate 122 by incorporating the hole for mounting the anchor conduit 124 into the utility cover plate 222, the third embodiment of the subject invention is the same as the second embodiment of the subject invention shown and described in connection with FIGS. 4 to 9.

FIGS. 12 and 13 illustrate a fourth embodiment 320 of the pesticide application system of the subject invention. The pesticide application system 320 includes a wall mounted cover plate 322 with an integral anchor conduit 324, a dispensing tube 326, and preferably, a closure fitting 328 for sealing the pesticide application system when the pesticide application system is not in use.

The wall mounted cover plate 322 is an auxiliary cover plate that is mounted on a conventional utility cover plate 330 such as but not limited to the light switch cover plate of FIGS. 12 and 13. As shown in FIGS. 12 and 13, the utility cover plate 330 is mounted on the outside surface of a covering layer 332 forming one side of a hollow wall 334 (the covering layer forming the other side of the hollow wall is not shown) and the dispensing tube 326 is housed within a cavity 336 of the hollow wall 334 between the two covering layers. The covering layers 332 may be made from various construction materials that overlay the framework of a building to form a wall, such as but not limited to, various types of wallboard, plywood, solid wood boards, paneling, insulating boards, sheathing, and masonry walls. The hollow wall 334 may be an exterior wall or an interior wall of a building. Where the hollow wall 334 is an exterior wall, the auxiliary cover plate 322 may be mounted on the interior or exterior side of the wall.

The auxiliary cover plate 322 has a channel 338 extending along the bottom of the auxiliary cover plate for mounting the auxiliary cover plate on an edge portion 340 of the utility cover plate 330. The channel 338 includes a rear flange 342 and a front flange 344. When the auxiliary cover plate 322 is mounted on an edge portion of the utility cover plate 330, the rear flange 342 extends between the utility cover plate 330 and the wallboard 332 of the hollow wall 334. When the auxiliary cover plate is mounted on the utility cover plate 330, the front flange 344 fits over the front of the edge portion of the utility cover plate and, preferably, has an internal contour corresponding to the external contour of the edge portion of the utility cover plate. Preferably, the channel 338 fits tightly over the edge portion of the utility cover plate 330 to hold the auxiliary cover plate in place and may be resilient to better grip the edge portion of the utility cover plate. In addition, the rear flange 342 becomes clamped between the edge portion of the utility cover plate 330 and the wallboard 332 when the utility cover plate is secured to the wall e.g. by being fastened to electrical box 346.

The auxiliary cover plate 322 also includes a hole 348 passing from the front to the back of the auxiliary cover plate through the integral anchor conduit 324. In a preferred embodiment, the hole 348 has two axially aligned portions. An outer portion 350 of the hole is cylindrical and forms a recess in the front of the auxiliary cover plate. An inner portion 352 of the hole is cylindrical, passes through the integral anchor conduit 324, and is used to convey a pressurized fluid pesticide from the outer surface of the hollow wall 334 into the internal cavity 336 of the hollow wall.

The closure fitting 328 has a cap 354 that is received within the outer cylindrical portion 350 of the hole 348 and a conical portion 356 that is pushed into the outer end of the inner portion 352 of the hole 348 to seal the pesticide application system when the pesticide application system is not in use and pulled from the inner portion 352 of the hole 348 to expose the inner portion 352 of the hole 348 for applying a pressurized fluid pesticide through the system. The integral anchor conduit 324 is tapered from an outer end to an inner end 360 of the anchor conduit and has a generally conical outer surface with an annular flange 362, preferably a frustoconical shaped annular flange, for anchoring the dispensing tube 326 to the anchor conduit 324 and to the hollow wall 334 by means of the anchor conduit 324, the auxiliary cover plate 322, and the utility cover plate 330. As shown in FIG. 13, with the auxiliary cover plate 322 mounted on an outer peripheral edge portion of the utility cover plate 330, neither the integral anchor conduit 324 nor the dispensing tube 326 extend into or through the electrical box 346 to which the utility cover plate 330 is secured. Instead, the anchor conduit 324 and dispensing tube 326 bypass the electrical box 346 to which the utility cover plate 330 is secured.

Although the dispensing tube 326 may be longer, the dispensing tube 326 is typically from about 1 to about 10 feet long and preferably from about 3 to about 10 feet long. Although, a fitting such as a plug may be used to close the far end of the dispensing tube 326, typically, the tubular sidewall of the dispensing tube 326 is heat sealed together at the far end 364 of the dispensing tube to close the far end of the dispensing tube. The tubular sidewall of the dispensing tube 326 is provided with longitudinally spaced apart openings 368 along the length of the dispensing tube through which a pressurized fluid pesticide is sprayed or otherwise dispensed from the tube into the wall cavity 336. The spacing and size of the openings 368 may vary depending on the type of fluid pesticide being dispensed and the pesticide coverage desired. However, spacings of about 4 to about 6 inches are typical. In addition to being spaced apart along the length of the dispensing tube 326, the openings 368 may also be located at different locations around the circumference of the dispensing tube 326, e.g. locations spaced apart 180°, 90°, or 60°, to dispense the pressurized fluid pesticide into the cavity 336 through or substantially through a dispensing pattern of up to 360° relative to the longitudinal centerline of the dispensing tube.

The dispensing tube 326 is typically made of an inexpensive polymeric material such as but not limited to a polyvinyl chloride polymer. The dispensing tube 326 has an external diameter less than the diameter of the hole 370 in the wallboard 332 so that the dispensing tube can be easily fed into the cavity 336 through the hole 370. If the dispensing tube 326 is compressible, the external diameter of the dispensing tube may be slightly greater than the diameter of the hole 370. However, with the auxiliary cover plate 322 covering the hole 370, the hole can be relatively large and there should be no need to squeeze the dispensing tube 326 through the hole 370 and thereby make the installation difficult. The dispensing tube 326 is elastic and the internal diameter of the dispensing tube 326 in an unexpanded state is less than the diameter of the annular flange 362 on the inner end portion of the anchor conduit 324 so that after the end of the dispensing tube is forced over the annular flange 362, the dispensing tube 326 is firmly secured to the anchor conduit 324. The dispensing tube 326 is flexible so that the dispensing tube can be passed through the hole 370 in the wallboard 332 and through the wall cavity 336. The flexibility of the dispensing tube 326 not only enables the dispensing tube to bend up, down or sideways once the dispensing tube has passed through the hole 370 into the cavity 336, but also enables the dispensing tube to pass around electrical wiring, plumbing, and other utilities or obstructions within the cavity 336. In addition, to being flexible, preferably, the dispensing tube 326 is sufficiently stiff to pass through loose fill insulation within the cavity, such as but not limited to blowing wool. Since the dispensing tube 326 of the pesticide application system can pass around electrical wiring, plumbing, and other utilities of obstructions within the cavity 336; can be any selected length to accomplish the task; and can be passed from the location of the utility plate cover 330 up and/or down through the wall cavity, the system 320 is not limited to dispensing pesticide only in the vicinity of the utility cover plate, but can be used to dispense pesticide throughout the entire cavity 336 or through selected portions of the cavity.

FIGS. 14 and 15 illustrate a fifth embodiment 420 of the pesticide application system of the subject invention. In this embodiment of the subject invention, a utility cover plate 422 includes an integral anchor conduit 424 that corresponds to the integral anchor conduit 324 of the auxiliary cover plate 322 of the fourth embodiment of the invention thereby eliminating the need for the auxiliary cover plate of the fourth embodiment of the invention. The pesticide application system 420 also includes a dispensing tube 426 and a closure fitting 428. Other than eliminating the need for the auxiliary cover plate 322 by incorporating the anchor conduit 424 into the utility cover plate 422, the fifth embodiment of the subject invention is the same as the fourth embodiment of the subject invention shown and described in connection with FIGS. 12 and 13.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A pesticide application system for dispensing a pressurized fluid pesticide within a hollow wall, comprising:

a hollow wall, the hollow wall having an interior cavity;

an anchor conduit anchoring the pesticide application system relative to the hollow wall and providing a fluid pesticide conduit for conveying a pressurized fluid pesticide from an outside surface of the hollow wall into the interior cavity of the hollow wall; the anchor conduit being anchored in a hole of the hollow wall, which passes from the outside surface of the hollow wall into the interior cavity of the hollow wall; the anchor conduit having an annular flange in contact with the outside surface of the hollow wall; the anchor conduit being directly secured to the hollow wall solely by means on the anchor conduit that is embedded into wallboard of the hollow wall surrounding the hole;

a dispensing tube within the cavity of the hollow wall for dispensing a pressurized fluid pesticide from the pesticide application system into the internal cavity of the hollow wall; the dispensing tube having an external diameter less than the internal diameter of the hole in the hollow wall so that the dispensing tube can be fed into the internal cavity of the hollow wall through the hole; the dispensing tube being flexible for bending the dispensing tube to position the dispensing tube within the cavity of the hollow wall and to enable the dispensing tube to pass around obstructions within the cavity of the hollow wall; the dispensing tube being at least three feet in length; the dispensing tube having a plurality of longitudinally spaced apart openings along the length of the dispensing tube for dispensing a pressurized fluid pesticide; the openings along the length of the dispensing tube being arranged to dispense a pressurized fluid pesticide from the dispensing tube in a substantially 360° pattern perpendicular to a longitudinal centerline of the dispensing tube; and the anchor conduit having a first end that is accessible on an outside surface of the hollow wall; the first end of the anchor conduit having an opening for connecting the pesticide application system to a pressurized fluid pesticide dispensing means; the anchor conduit having a second end that extends into the hollow wall; and the dispensing tube being mounted on the second end of the anchor conduit.

2. The pesticide application system according to claim 1, wherein:

the pesticide application system includes a removable fitting for sealing the opening in the first end of the anchor conduit when the pesticide application system is not being used.

3. A pesticide application system, comprising:

a utility cover plate secured to an electrical box in a hollow wall and mounted on an outside surface of the hollow wall;

an auxiliary cover plate mounted on an outer peripheral edge portion of the utility cover plate and extending outward from the outer peripheral edge portion of the utility cover plate along the outside surface of the hollow wall to cover a portion of the outside surface of the hollow wall adjacent the utility cover plate; the auxiliary cover plate having an anchor conduit extending into an opening in the hollow wall for anchoring the pesticide application system relative to the hollow wall and providing a fluid pesticide conduit for conveying a pressurized fluid pesticide from an outside surface of the hollow wall into an interior cavity of the hollow wall that does not extend into or through the electrical box;

a dispensing tube for dispensing a pressurized fluid pesticide from the pesticide application system into the interior cavity of the hollow wall; the dispensing tube being flexible for bending the dispensing tube to position the dispensing tube within the hollow wall cavity and to enable the dispensing tube to pass around obstructions within the hollow wall cavity; and the dispensing tube having a plurality of longitudinally spaced apart openings along a length of the dispensing tube for dispensing a pressurized fluid pesticide; and the anchor conduit having a first end that is accessible on the outside surface of a hollow wall; the first end of the anchor conduit having an opening for connecting the pesticide application system to a pressurized fluid pesticide dispensing means; the anchor conduit having a second end that extends into the opening in the hollow wall; and the dispensing tube being mounted on the second end of the anchor conduit, not extending into or through the electrical box, and being located within the interior cavity of the hollow wall for dispensing pesticide within the interior cavity of the hollow wall.

4. The pesticide application system according to claim 3, wherein:

the pesticide application system includes a removable fitting for sealing the opening in the first end of the anchor conduit when the pesticide application system is not being used.

5. The pesticide application system according to claim 3, wherein:

the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

6. The pesticide application system according to claim 3, wherein:

the utility cover plate is selected from a group consisting of an electrical switch cover plate, an electrical outlet cover plate, and a telephone jack cover plate.

7. The pesticide application system according to claim 3, wherein:

the auxiliary cover plate has a hole therein for receiving the anchor conduit; and the anchor conduit is a plug that extends into and is anchored within the hole in the auxiliary cover plate.

8. The pesticide application system according to claim 7, wherein:

the pesticide application system includes a removable fitting for sealing the opening in the first end of the anchor conduit when the pesticide application system is not being used.

9. The pesticide application system according to claim 7, wherein:

the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

10. The pesticide application system according to claim 7, wherein:

the utility cover plate is selected from a group consisting of an electrical switch cover plate, an electrical outlet cover plate, and a telephone jack cover plate.

11. The pesticide application system according to claim 3, wherein:

the anchor conduit is an integral part of the auxiliary cover plate.

12. The pesticide application system according to claim 11, wherein:

the pesticide application system includes a removable fitting for sealing the opening in the first end of the anchor conduit when the pesticide application system is not being used.

13. The pesticide application system according to claim 11, wherein:

the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

14. The pesticide application system according to claim 11, wherein:
the utility cover plate is selected from a group consisting of an electrical switch cover plate, an electrical outlet cover plate, and a telephone jack cover plate.

15. A pesticide application system, comprising:
a utility cover plate secured to an electrical box in a hollow wall and mounted on an outside surface of the hollow wall; the utility cover plate having an anchor conduit located adjacent an outer peripheral edge portion of the utility cover plate and extending into an opening in the hollow wall for anchoring the pesticide application system relative to the hollow wall and providing a fluid pesticide conduit for conveying a pressurized fluid pesticide from an outside surface of the hollow wall into an interior cavity of the hollow wall that does not extend into or through the electrical box;
a dispensing tube for dispensing a pressurized fluid pesticide from the pesticide application system into the interior cavity of the hollow wall; the dispensing tube being flexible for bending the dispensing tube to position the dispensing tube within the hollow wall cavity and to enable the dispensing tube to pass around obstructions within the hollow wall cavity; and the dispensing tube having a plurality of longitudinally spaced apart openings along a length of the dispensing tube for dispensing a pressurized fluid pesticide; and
the anchor conduit having a first end that is accessible on the outside surface of a hollow wall; the first end of the anchor conduit having an opening for connecting the pesticide application system to a pressurized fluid pesticide dispensing means; the anchor conduit having a second end that extends into the hollow wall; and the dispensing tube being mounted on the second end of the anchor conduit, not extending into or through the electrical box, and being located within the interior cavity of the hollow wall for dispensing pesticide within the interior cavity of the hollow wall.

16. The pesticide application system according to claim 15, wherein:
the pesticide application system includes a removable fitting for sealing the opening in the first end of the anchor conduit when the pesticide application system is not being used.

17. The pesticide application system according to claim 15, wherein:
the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

18. The pesticide application system according to claim 15, wherein:
the utility cover plate is selected from a group consisting of an electrical switch cover plate, an electrical outlet cover plate, and a telephone jack cover plate.

19. The pesticide application system according to claim 15, wherein:
the utility cover plate has a hole therein for receiving the anchor conduit; and the anchor conduit being a plug that extends into and is anchored within the hole in the utility cover plate.

20. The pesticide application system according to claim 19, wherein:
the pesticide application system includes a removable fitting for sealing the opening in the first end of the anchor conduit when the pesticide application system is not being used.

21. The pesticide application system according to claim 19, wherein:
the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

22. The pesticide application system according to claim 19, wherein:
the utility cover plate is selected from a group consisting of an electrical switch cover plate, an electrical outlet cover plate, and a telephone jack cover plate.

23. The pesticide application system according to claim 15, wherein:
the anchor conduit is an integral part of the utility cover plate.

24. The pesticide application system according to claim 23, wherein:
the pesticide application system includes a removable fitting for sealing the opening in the first end of the anchor conduit when the pesticide application system is not being used.

25. The pesticide application system according to claim 23, wherein:
the dispensing tube is at least three feet in length; and the openings along the length of the dispensing tube are arranged to dispense a pressurized fluid from the dispensing tube in a substantially 360° pattern perpendicular to a longitudinal centerline of the dispensing tube.

26. The pesticide application system according to claim 23, wherein:
the utility cover plate is selected from a group consisting of an electrical switch cover plate, an electrical outlet cover plate, and a telephone jack cover plate.

\* \* \* \* \*